United States Patent [19]

Weinstein et al.

[11] 3,852,264

[45] Dec. 3, 1974

[54] GENTAMICIN C OXAZOLIDINE DERIVATIVES

[75] Inventors: Jay Weinstein, Bloomfield, N.J.;
David Cooper, Swedeland, Pa.

[73] Assignee: Schering Corporation, Bloomfield, N.J.

[22] Filed: Jan. 7, 1972

[21] Appl. No.: 216,263

Related U.S. Application Data

[63] Continuation-in-part of Ser. No. 852,948, Aug. 25, 1969, abandoned.

[52] U.S. Cl............ 260/210 AB, 424/180, 424/181
[51] Int. Cl............................................. C07c 47/18
[58] Field of Search................... 260/210 AB, 210 R

[56] References Cited

UNITED STATES PATENTS

| | | | |
|---|---|---|---|
| 2,916,485 | 12/1959 | Frohardt et al. | 260/210 AB |
| 3,350,387 | 10/1967 | Vanderhaeghe | 260/210 R |
| 3,356,674 | 12/1967 | Ikeda et al. | 260/210 R |

*Primary Examiner*—Johnnie R. Brown
*Attorney, Agent, or Firm*—Stephen B. Coan; Bruce M. Eisen; Arthur E. Wilfond

[57] ABSTRACT

Disclosed herein are oxazolidine derivatives formed by the condensation of aldehydes with gentamicin complex or its components. These compounds exhibit strong antimicrobial properties.

7 Claims, No Drawings

GENTAMICIN C OXAZOLIDINE DERIVATIVES

This application is a continuation-in-part of our co-pending application Ser. No. 852,948, filed Aug. 25, 1969, now abandoned.

This invention relates to compositions of matter each of which may be chemically considered as oxazolidine derivatives and to processes for making and using such compositions.

The invention sought to be patented in its composition aspect resided in the concept of chemical compounds, both individually and admixed, having the structural formula:

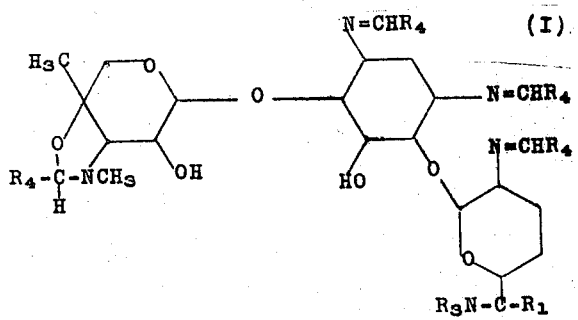

wherein $R_1$ is hydrogen or methyl; $R_3$ is $R_4HC=$ or

and $R_4$ is an organic radical. As will be more apparent hereinafter, the nature of the organic radical is not a significant parameter of the scope of the broad invention. In other words, $R_4$ includes all hydrocarbon radicals having any functional substituents. Thus $R_4$ can be an aliphatic, aromatic, or heterocyclic radical.

Alkylidene radicals may be straight or branched and include, for example, ethylidene, propylidene, hexylidene, decylidene, dodecylidene, and the isomeric forms thereof. Cycloalkylidene radicals include cyclopropylidene, cyclopentylidene, cyclohexylidene, 3-cyclohexylpropylidene and the like. Examples of aralkylidene radicals include benzylidene, 2-phenethylidene, 3-phenylpropylidene, α-naphthylmethylene, 3,6-dichlorobenzylidene, p-nitrobenzylidene and the like. It is understood, of course, that the aryl nucleus can be substituted by functional groups such as halogen, nitro, hydroxy, trifluoromethyl, lower alkoxy, hydroxy lower alkyl and the like. Exemplary of aromatic heterocyclic rings are furyl, thienyl, thiazolyl, thiadiazolyl, pyrazinyl, triazoyl, pyridyl, pyrazolyl, imidazolyl, oxazolyl, pyrimidinyl, pyrrolyl, dihydroimidazolyl, dihydropyridazinyl, isoxazolyl, benzimidazolyl, indazolyl, benzoxazolyl, pyrazolonyl, isothiazolyl, pyranyl, pyridazinyl and dihydropyridazinyl rings and substituted rings thereof wherein the substituent can be, for example, lower alkyl, hydroxy lower alkyl, halo, nitro, phenyl benzylmercapto, lower alkoxy and lower alkylthio.

Gentamicin is an antibiotic complex which exhibits a broad spectrum of activity against important microorganisms. As taught in U.S. Pat. No. 3,091,572 (Ludemann et al.), gentamicin can be produced by cultivating a microorganism of the group consisting of Micromonospora purpurea and Micromonospora echinospora in an aqueous nutrient medium under aerobic conditions until substantial antibiotic activity is imparted thereto. The isolation and recovery of the gentamicin complex is also described in the aforesaid patent. It has been further shown that the gentamicin complex consists of three very closely related components referred to as gentamicin $C_1$ gentamicin $C_{1a}$ and gentamicin $C_2$. Methods for the preparative separation of these discrete substances by use of chromatographic column procedures are described for example in the Journal of Chromatography, Vol. 34, pp. 210–215, April 1968. It has been determined that the chemical structure of these three closely related pseudo-oligosaccharides is as follows:

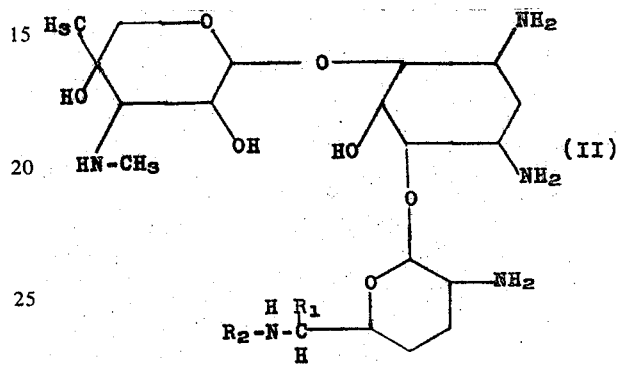

wherein in component $C_1$, both $R_1$ and $R_2$ are methyl; in component $C_{1a}$, both $R_1$ and $R_2$ are hydrogen; and in component $C_2$, $R_1$ is methyl and $R_2$ is hydrogen.

The compounds of this invention can be prepared by condensing gentamicin $C_1$, $C_{1a}$ or $C_2$ or a mixture thereof with an aldehyde. We have surprisingly found that the reaction product of this process is not the normal Schiff base, but rather, an oxazolidine derivative.

The compounds of this invention exhibit wide antibacterial spectra similar to that of gentamicin complex and its components as described in U.S. Pat. No. 3,091,572 and in the Journal of Bacteriology, September 1967, pp. 789–790. They are active against both gram positive and gram negative organisms. Exemplary of such organisms inhibited by the compounds of this invention are Staphylococcus aureus, Escherichia coli, and Pseudomonas aeruginosa. In aqueous acid medium the compounds of this invention revert in time to the parent gentamicin.

The compounds of formula I possess distinct advantages as antibacterial agents as compared to gentamicin complex or gentamicin $C_1$, $C_{1a}$ or $C_2$ individually. Gentamicin complex and its components are hygroscopic and are readily oxidized resulting in discoloration. Gentamicin sulfate, which is the common commercial form of gentamicin, is insoluble in organic solvents. The compounds of this invention on the other hand, are stable and more soluble in common organic solvents such as benzene, chloroform, petrolatum and the like.

Since they each revert to gentamicin in aqueous acid medium, they each are useful in the form of solutions with volatile solvents for disinfecting and sterilizing surgical instruments and utensils, hospital rooms and the like. Such solutions can be applied directly as a liquid or sprayed in aerosol form. Thus it is apparent that the nature of the organic radical $R_4$ in the compounds of formula I is immaterial since they all revert to gentamicin in this application.

In another embodiment, a bandage can be impregnated with a solution of one or more dermatologically acceptable compounds of this invention in a suitable solvent, e.g. petrolatum, to provide sustained antibacterial activity in contact with the skin. In still a further embodiment one can employ parenterally acceptable species of this invention with the advantage that they tend to provide more sustained serum levels after parenteral dosing. This is of particular advantage in veterinary applications. The properties of the other product (or products) resulting from the reversion of a compound of this invention to gentamicin will largely determine whether the compound is dermatologically acceptable, parenterally acceptable or the like.

The compounds of formula I wherein $R_3$ equals $R_4HC=$ are not capable of ordinary salt formation with acids. On the other hand, those compounds of formula I wherein $R_3$ is

i.e. those derived from gentamicin $C_1$, contain a free methylamino moiety and are suitable for formation of acid addition salts. Exemplary of such acid addition salts are those formed with maleic, fumaric, succinic, tartaric, citric, malic, cinnamic, sulfonic, hydrochloric, hydrobromic, sulfuric, phosphoric, and nitric acids. The acid addition salts may be prepared in the conventional manner, by treating a solution or suspension of the free base in an organic solvent with the desired acid, and then recovering the salt which forms by crystallization techniques.

One can take advantage of this differential salt-forming ability of the compounds of formula I to separate gentamicin $C_1$ and its derivatives from gentamicin $C_{1a}$ and gentamicin $C_2$ and their derivatives. Gentamicin $C_1$ and its derivatives are of particular interest as compared to gentamicin $C_{1a}$ and gentamicin $C_2$ and their derivatives in view of its tendency to exhibit reduced ataxic side effects.

According to this method a suitable aldehyde is added to gentamicin complex in the manner described hereinafter. The reaction product, dissolved in a non-aqueous medium such as chloroform, is passed through a cation exchange resin column (in its H+ form), such as an IRC-50 column. The gentamicin $C_1$ oxazolidine derivative will be selectively adsorbed since it alone can form the acid addition salt. The gentamicin $C_1$ can then be recovered by elution with suitable acid or base. Strong acid will regenerate gentamicin $C_1$. Suitable aldehydes for this purpose are benzaldehydes substituted in the ortho position with electron-withdrawing moieties, e.g., halogen, trifluoromethyl and the like, as for example 2,6-dichlorobenzaldehyde. This method of separation of gentamicin $C_1$ and its derivatives avoids the necessity for time-consuming, laborious chromatographic separations.

Another aspect of this invention resides in the purification of the compounds of formula II by means of forming those oxazolidine derivatives of formula I which are highly crystalline. By this means contaminants present from the fermentation broth or elsewise may be removed in the filtrate. For this purpose aromatic aldehyde compounds, and in particular benzaldehyde and its functionally substituted derivatives, are especially suitable.

The compounds of this invention can be prepared by mixing a compound of formula II, either individually or admixed with one or both of the other compounds embraced by formula II, with an aldehyde ($R_4HC=O$ wherein $R_4$ is any organic radical). The reaction can be carried out at ambient temperature in an inert organic solvent such as ethanol. The aldehyde should preferably be present in about a stoichiometric amount, i.e., 4 moles of aldhyde per mole of gentamicin $C_1$ and 5 moles of aldehyde per mole of gentamicin $C_{1a}$ or $C_2$.

Any aldehydes, i.e., any $R_4HC=O$ wherein $R_4$ is any organic radical, can be used. Typical aldehydes include acetaldehyde, propionaldehyde, butyraldehyde, lauric aldehyde, benzaldehyde, o-chlorobenzaldehyde, p-nitrobenzaldehyde, phenylacetaldehyde, hydrocinnamaldehyde, 5-nitrofurfuraldehyde pyridoxal, 3-cyclopentanepropionaldehyde, cyclohexaneacetaldehyde, cycloheptanecarboxaldehyde, 2,2-dimethylcyclopropylacetaldehyde and the like.

This invention is further illustrated by the following non-limiting example:

EXAMPLE 5.0 g. Gentamicin $C_2$ in 60 ml. absolute ethanol is treated with 5.9 g. benzaldehyde (slight excess over 5 equivalents) and refluxed for 1 hour. The solution is cooled and filtered affording 7.0 g. of a white crystalline solid, m.p. 205.5°–212.2°C. Found:C, 72.75; H, 6.87; N, 7.78%. Calculated (for $C_{55}H_{61}N_5O_7$):C, 73.05; H, 6.81; N, 7.74% $[\alpha]_D^{26} = -16.8°$ (C= 0.3% in $CHCl_3$). The n.m.r. spectrum of the compound is in agreement with the structure:

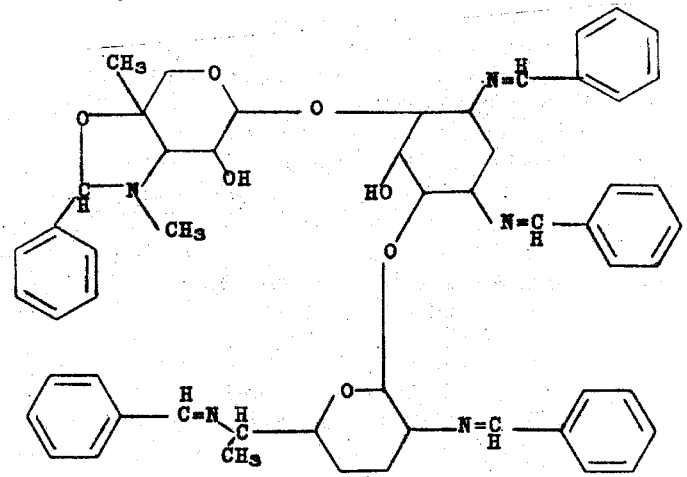

This oxazolidine exhibits a spectrum of anti-bacterial activity similar to gentamicin $C_2$ base.

In place of gentamicin $C_2$ in the Example, one can substitute (a) gentamicin $C_1$ to produce the corresponding oxazolidine having m.p. 203°–207°C and $[\alpha]_D^{26}+42.7$ and (b) gentamicin $C_{1a}$ to produce the corresponding oxazolidine having m.p. 188°–191°C and $[\alpha]_D^{26}+41.3$.

Similarly, in place of benzaldehyde in the Example, one can substitute for example (c) propionaldehyde to yield an oxazolidine having m.p. 136°–149°C, $[\alpha]_D^{26}+56.3$; (d) lauric aldehyde to yield and oxazolidine as an oil having $[\alpha]_D^{26}+27.4$; (e) p-chlorobenzaldehyde to yield an oxazolidine having m.p. 173°–177°C, $[\alpha]_D^{26}-37.0$; (f) pentafluorobenzaldehyde to yield an oxazolidine having m.p. 211°–217°C and $[\alpha]_D^{26}+34.4$; and (g) 1-naphthaldehyde to yield an oxazolidine having m.p. 187°–191°C and $[\alpha]_D^{26}-47.5$.

In a similar manner gentamicin complex, gentamicin $C_1$, gentamicin $C_{1a}$ and gentamicin $C_2$ can be condensed with other aldehydes to produce the corresponding oxazolidine derivatives as for example those of:

gentamicin complex and salicylaldehyde,
gentamicin sulfate complex and pyridoxal hydrochloride,
gentamicin $C_1$ and o-chlorobenzaldehyde
gentamicin $C_1$ and cinnamaldehyde,
gentamicin $C_1$ and 5-nitrofurfuraldehyde,
gentamicin $C_{1a}$ and p-bromobenzaldehyde,
gentamicin $C_2$ and veratraldehyde.

Numerous other variations of the above composition of matter will be apparent to one skilled in the art within the spirit of this invention.

What is claimed is:

1. A composition of matter having the structural formula:

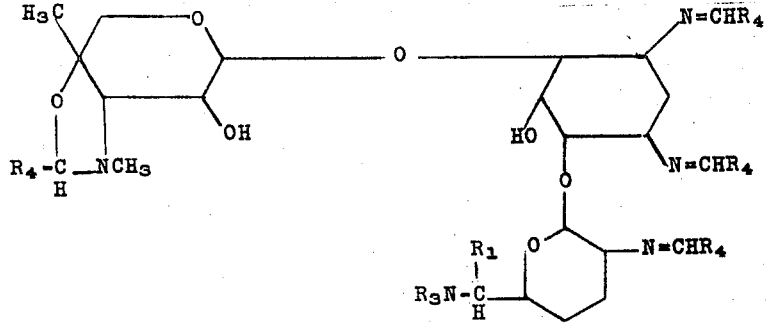

wherein $R_1$ is hydrogen or methyl; $R_3$ is $R_4HC=$ or

and $R_4$ is an organic radical.

2. A composition of matter according to claim 1 wherein $R_1$ is methyl and $R_3$ is

3. A composition of matter according to claim 1 wherein $R_4$ is alkyl containing 1 to 20 carbon atoms.

4. A composition of matter according to claim 1 wherein $R_4$ is phenyl.

5. A composition of matter according to claim 1 wherein $R_4$ is ethyl.

6. A composition of matter according to claim 1 wherein $R_4$ is 5-nitrofuryl.

7. A process for the separation of gentamicin $C_1$ from gentamicin complex comprising the steps of
   a. reacting a stoichiometric amount of aldehyde with gentamicin complex to form an oxazolidine derivative having the structural formula depicted in claim 1;
   b. passing said gentamicin complex oxazolidine derivative dissolved in a non-aqueous medium through a cation exchange resin in the acid form to selectively adsorb the gentamicin $C_1$ oxazolidine derivative;
   c. eluting the gentamicin $C_1$ oxazolidine derivative adsorbed on said resin with acid or base.

* * * * *